United States Patent
Shiobara et al.

(10) Patent No.: US 9,944,760 B2
(45) Date of Patent: Apr. 17, 2018

(54) SILICONE-MODIFIED EPOXY RESIN, COMPOSITION CONTAINING SAID EPOXY RESIN, AND CURED PRODUCT THEREOF

(71) Applicants: Shin-Etsu Chemical Co., Ltd., Tokyo (JP); Nippon Kayaku Kabushiki Kaisha, Tokyo (JP)

(72) Inventors: Toshio Shiobara, Tokyo (JP); Junichi Sawada, Gunma (JP); Miyuki Wakao, Gunma (JP); Tsutomu Kashiwagi, Gunma (JP); Naofusa Miyagawa, Tokyo (JP); Yoshihiro Kawada, Tokyo (JP); Chie Sasaki, Tokyo (JP); Naosuke Taniguchi, Tokyo (JP)

(73) Assignees: Shin-Etsu Chemical Co., Ltd. (JP); Nippon Kayaku Kabushiki Kaisha (JP)

( * ) Notice: Subject to any disclaimer, the term of this patent is extended or adjusted under 35 U.S.C. 154(b) by 0 days.

(21) Appl. No.: 15/120,482

(22) PCT Filed: Feb. 18, 2015

(86) PCT No.: PCT/JP2015/054378
§ 371 (c)(1),
(2) Date: Aug. 19, 2016

(87) PCT Pub. No.: WO2015/125803
PCT Pub. Date: Aug. 27, 2015

(65) Prior Publication Data
US 2017/0073457 A1 Mar. 16, 2017

(30) Foreign Application Priority Data
Feb. 19, 2014 (JP) .................. 2014-029447

(51) Int. Cl.
| | | |
|---|---|---|
| C08G 77/50 | (2006.01) |
| C08G 77/14 | (2006.01) |
| C08G 77/38 | (2006.01) |
| C08G 59/34 | (2006.01) |
| C08G 59/40 | (2006.01) |
| C08G 59/02 | (2006.01) |

(Continued)

(52) U.S. Cl.
CPC ........... *C08G 77/50* (2013.01); *C08G 59/027* (2013.01); *C08G 59/306* (2013.01); *C08G 59/3281* (2013.01); *C08G 59/34* (2013.01); *C08G 59/40* (2013.01); *C08G 59/4215* (2013.01); *C08G 59/4276* (2013.01); *C08G 59/4284* (2013.01); *C08G 59/688* (2013.01); *C08G 77/14* (2013.01); *C08G 77/20* (2013.01); *C08G 77/38* (2013.01); *C09J 183/14* (2013.01)

(58) Field of Classification Search
USPC .................................................... 528/10–43
See application file for complete search history.

(56) References Cited

U.S. PATENT DOCUMENTS 3,431,143 A * 3/1969 Samuel .................... C08L 83/06
162/164.3
5,260,349 A 11/1993 Crivello
(Continued)

FOREIGN PATENT DOCUMENTS

| JP | 58-168658 A | 10/1983 |
| JP | 02-207087 | * 8/1990 |

(Continued)

OTHER PUBLICATIONS

"Polydiméthyl Siloxane Photoréticulable par voie Cationique-I. Synthése et Photoréticulation de Polydiméthyl Siloxane a Greffons Époxy Norbornéné" authored by LeCamp et al. and published in the European Polymer Journal (1997) 33(9), 1453-1462.*

(Continued)

*Primary Examiner* — Marc S Zimmer
(74) *Attorney, Agent, or Firm* — Wood, Philips, Katz, Clark & Mortimer

(57) ABSTRACT

The purpose of the present invention is to provide a silicone-modified epoxy resin which produces a cured product having excellent low gas permeability and strength; a composition of the resin; and an epoxy resin cured product obtainable by curing the composition.

Disclosed is an epoxy resin represented by the following Formula (1):

(1)

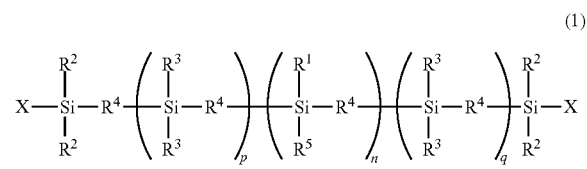

wherein $R^1$ independently represents a monovalent aromatic hydrocarbon group having 6 to 12 carbon atoms; $R^2$ independently represents a monovalent aliphatic hydrocarbon group having 1 to 12 carbon atoms; $R^3$ independently represents a monovalent aliphatic hydrocarbon group having 1 to 12 carbon atoms or a monovalent aromatic hydrocarbon group having 6 to 12 carbon atoms; $R^4$ represents an oxygen atom or a divalent hydrocarbon group having an aliphatic cyclic structure; $R^5$ represents silicone chain having a norbornane epoxy structure at either end; and X represents an organic group having a norbornane epoxy group.

10 Claims, 2 Drawing Sheets

(51) Int. Cl.
  *C08G 59/30* (2006.01)
  *C08G 59/32* (2006.01)
  *C09J 183/14* (2006.01)
  *C08G 59/42* (2006.01)
  *C08G 59/68* (2006.01)
  *C08G 77/20* (2006.01)

(56) References Cited

U.S. PATENT DOCUMENTS

| | | |
|---|---|---|
| 5,492,981 A | 2/1996 | Hoehn et al. |
| 6,815,520 B2 | 11/2004 | Yoneda et al. |
| 2007/0299165 A1 | 12/2007 | Haitko |
| 2008/0160317 A1 | 7/2008 | Haitko |
| 2013/0345359 A1* | 12/2013 | Onai .................... H01L 33/501 524/588 |

FOREIGN PATENT DOCUMENTS

| | | |
|---|---|---|
| JP | 5-310885 A | 11/1993 |
| JP | 7-97433 A | 4/1995 |
| JP | 7-188391 A | 7/1995 |
| JP | 2001-519838 A | 10/2001 |
| JP | 2002-265787 A | 9/2002 |
| JP | 2004-527602 A | 9/2004 |
| JP | 2006-282988 A | 10/2006 |
| JP | 2008-045088 A | 2/2008 |
| JP | 2008-45088 A | 2/2008 |
| JP | 2011-63686 A | 3/2011 |
| JP | 2012-131989 A | 7/2012 |
| JP | 2014-091757 * | 5/2014 |

OTHER PUBLICATIONS

Abstract for JP 2002-145872 (May 2002).*
Abstract for DE 2106413 (1971).*
Machine translation of JP 2014-091757 (no date).*
International Search Report (ISR) issued in the basic PCT application No. PCT/JP2015/054378 and its English language translation.
Written Opinion (WO) issued in the basic PCT application No. PCT/JP2015/054378 and its English language translation.

* cited by examiner

SILICONE-MODIFIED EPOXY RESIN, COMPOSITION CONTAINING SAID EPOXY RESIN, AND CURED PRODUCT THEREOF

BACKGROUND ART

Regarding photosemiconductor element sealing resin compositions, compositions including a bisphenol A type epoxy resin having excellent adhesiveness or mechanical strength; an epoxy resin which does not absorb UV, for example, a hydrogenated bisphenol A type epoxy resin or an alicyclic epoxy resin; and a curing agent as well as a curing catalyst, are frequently used. However, as the luminance and output power of LED elements are increasing, there is a problem of discoloration and cracking caused by the light, heat and the like emitted by the LED elements.

As a solution for these problems, resins produced by introducing an epoxy group into a silicone resin which gives a cured product that does not absorb UV and has flexibility, are known. For example, a silicone resin having one or more cyclic ether-containing groups such as a glycidyl group and an epoxycyclohexyl group (Patent Literature 1), a reaction product between an epoxyalkoxysilane and a silanol (Patent Literature 2), and a mixture combining an alicyclic epoxy-modified silicone resin and an alicyclic epoxy resin (Patent Literature 3), are known. However, since silicone resins have very high gas permeability compared to epoxy resins, as the silicone content increases, it becomes more difficult to use silicone resins for applications where low gas permeability is needed. Thus, an addition reaction type phenyl-based silicone resin composition has been disclosed as a resin composition having low gas permeability (Patent Literature 4); however, the resin composition is still not satisfactory in view of low gas permeability and adhesiveness.

CITATION LIST

Patent Literature

Patent Literature 1: JP 2008-45088 A
Patent Literature 2: JP 7-97433 A
Patent Literature 3: JP 2006-282988 A
Patent Literature 4: JP 2002-265787 A

SUMMARY OF INVENTION

Technical Problem

The present invention was achieved in view of such circumstances, and it is an object of the invention to provide a silicone-modified epoxy resin composition which produces a cured product having excellent low gas permeability and strength, and an epoxy resin cured product obtainable by curing the composition.

Under such circumstances as described above, the present inventors conducted a thorough investigation, and as a result, the inventors finally reached the present invention.

That is, the present invention relates to the following items (1) to (10).

(1) A silicone-modified epoxy resin represented by the following Formula (1):

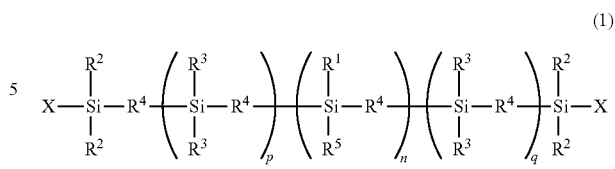

wherein $R^1$ independently represents a monovalent aromatic hydrocarbon group having 6 to 12 carbon atoms;

$R^2$ independently represents a monovalent aliphatic hydrocarbon group having 1 to 12 carbon atoms;

$R^3$ independently represents a monovalent aliphatic hydrocarbon group having 1 to 12 carbon atoms or a monovalent aromatic hydrocarbon group having 6 to 12 carbon atoms;

$R^4$ represents an oxygen atom or a divalent hydrocarbon group represented by the formula:

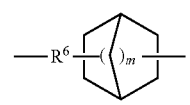

wherein $R^6$ represents a single bond or an alkylene group having 1 to 6 carbon atoms; and m represents an integer from 0 to 2;

$R^5$ represents a group represented by the following Formula (3):

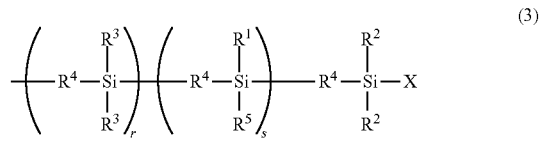

wherein $R^1$, $R^2$, $R^3$, and $R^4$ respectively have the same meanings as described above; r and s each represent an integer from 0 to 10; X represents a structure represented by Formula (5) as mentioned later; and the repeating units represented by r and s in the formula respectively include a block unit structure and/or a random unit structure; or $R^5$ represents a group represented by the following Formula (4):

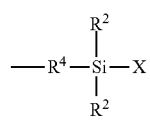

wherein $R^2$, $R^4$, and X respectively have the same meanings as described above;

X represents a group represented by the following Formula (5):

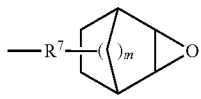
(5)

wherein $R^7$ represents a single bond or an alkylene group having 1 to 6 carbon atoms and optionally containing an ester bond or an ether bond; and m represents an integer from 0 to 2;

n represents an integer from 1 to 10; and p and q each represent an integer from 0 to 10, provided that the repeating units represented by p, n, and q in the formula respectively include a block unit structure and/or a random unit structure.

(2) The silicone-modified epoxy resin according to (1), wherein the silicone-modified epoxy resin is an addition reaction product between a compound represented by the following Formula (6):

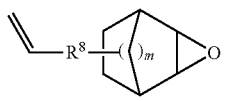
(6)

wherein m has the same meaning as described above; and $R^8$ represents a single bond or an alkylene group having 1 to 4 carbon atoms and optionally containing an ester bond or an ether bond, and a compound represented by the following Formula (7):

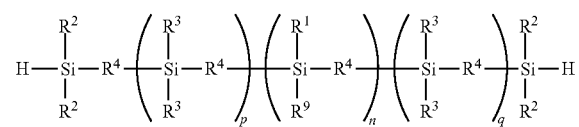
(7)

wherein $R^1$ to $R^4$, n, p, and q respectively have the same meanings as described above; and $R^9$ represents a group represented by the following Formula (8):

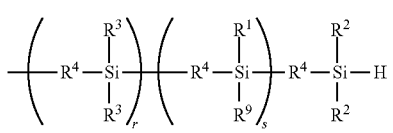
(8)

wherein $R^1$ to $R^4$, $R^9$, r, and s respectively have the same meanings as described above, or $R^9$ represents a group represented by the following Formula (9):

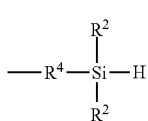
(9)

wherein $R^2$ and $R^4$ respectively have the same meanings as described above.

(3) The silicone-modified epoxy resin according to (1), wherein the silicone-modified epoxy resin is obtained by oxidizing a polyvalent olefin-based compound represented by the following Formula (10):

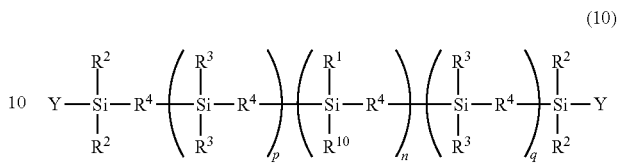
(10)

wherein $R^1$ to $R^4$, n, p, and q respectively have the same meanings as described above; and $R^{10}$ represents a group represented by the following Formula (11):

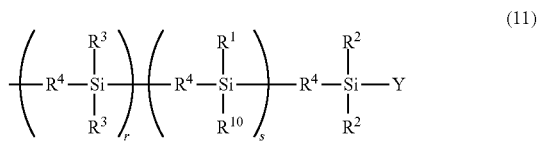
(11)

wherein $R^1$ to $R^4$, $R^{10}$, r, and s respectively have the same meanings as described above,
or the following Formula (12):

(12)

and Y represents a group represented by the following Formula (13):

(13)

wherein $R^7$ and m respectively have the same meanings as described above.

(4) An epoxy resin composition including (A) a silicone-modified epoxy resin according to any one of (1) to (3); and (B) an epoxy resin curing agent.

(5) The epoxy resin composition according to (4), further comprising (C) an epoxy resin curing accelerator.

(6) The epoxy resin composition according to (5), wherein the epoxy resin curing agent is at least any one selected from an amine-based curing agent, a phenolic curing agent, an acid anhydride curing agent, and a polyvalent carboxylic acid resin.

(7) A cured product formed by curing the epoxy resin composition according to any one of (4) to (6).

MODE FOR CARRYING OUT THE INVENTION

Figure 1:
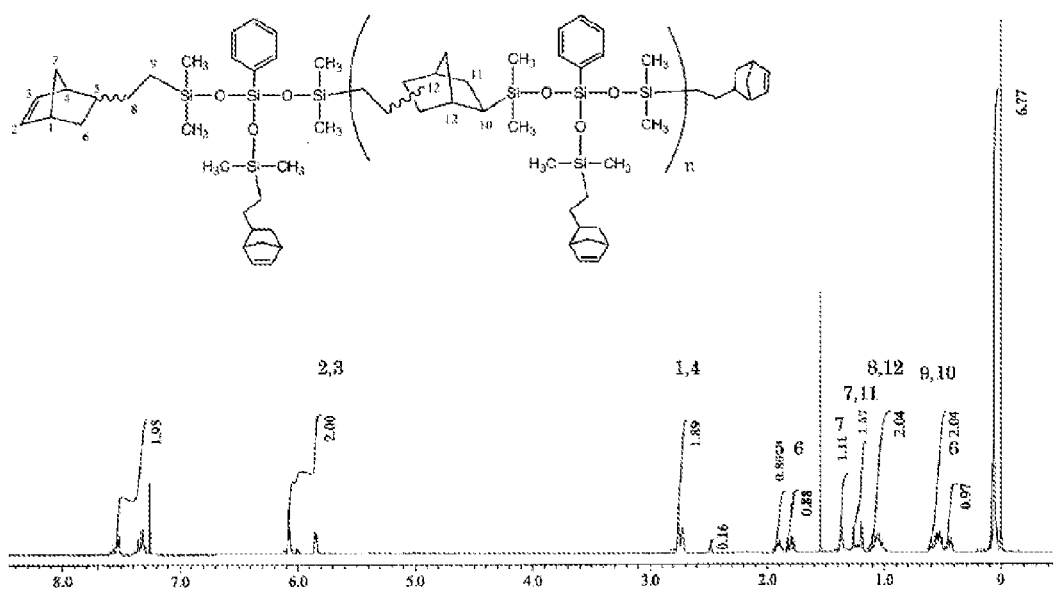
FIG. 1 is a $^1$H-NMR spectrum of polyolefin-based compound 1 obtained in Example 1.

The silicone-modified epoxy resin of the present invention is a branched silicone-modified epoxy resin represented by the following Formula (1):

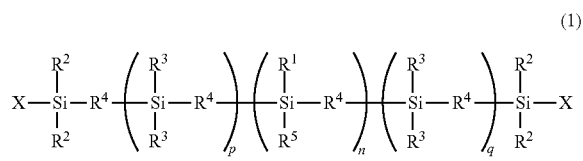

wherein in Formula (1), $R^1$ independently represents a monovalent aromatic hydrocarbon group having 6 to 12 carbon atoms; $R^2$ independently represents a monovalent aliphatic hydrocarbon group having 1 to 12 carbon atoms; $R^3$ independently represents a monovalent aliphatic hydrocarbon group having 1 to 12 carbon atoms or a monovalent aromatic hydrocarbon group having 6 to 12 carbon atoms; $R^4$ represents an oxygen atom or a divalent hydrocarbon group represented by Formula (2); $R^5$ represents a group represented by Formula (3) or Formula (4); and X represents an epoxy group represented by Formula (5).

$R^1$ independently represents a monovalent aromatic hydrocarbon group having 6 to 12 carbon atoms, and specific examples thereof include a phenyl group and a naphthyl group. From the viewpoints of low gas permeability and transparency of the cured product, a phenyl group is preferred.

$R^2$ independently represents a monovalent aliphatic hydrocarbon group having 1 to 12 carbon atoms, and specific examples thereof include saturated monovalent aliphatic hydrocarbon groups, such as alkyl groups such as a methyl group, an ethyl group, an n-propyl group, an isopropyl group, an n-butyl group, a t-butyl group, a heptyl group, a 2-ethylhexyl group, a heptyl group, and an octyl group; and unsaturated monovalent aliphatic hydrocarbon groups, such as alkenyl groups such as a vinyl group, an allyl group, an isopropenyl group, and a butenyl group. From the viewpoint of transparency of the cured product, preferred examples include a methyl group, an ethyl group, an n-propyl group, an isopropyl group, an n-butyl group, a t-butyl group, and a heptyl group, and a methyl group is more preferred.

$R^3$ independently represents a monovalent aliphatic hydrocarbon group having 1 to 12 carbon atoms or a monovalent aromatic hydrocarbon group having 6 to 12 carbon atoms, and specific examples of the monovalent aliphatic hydrocarbon group having 1 to 12 carbon atoms include saturated monovalent aliphatic hydrocarbon groups, such as alkyl groups such as a methyl group, an ethyl group, an n-propyl group, an isopropyl group, an n-butyl group, a t-butyl group, a heptyl group, a 2-ethylhexyl group, a heptyl group, and an octyl group; and unsaturated monovalent aliphatic hydrocarbon groups, such as alkenyl groups such as a vinyl group, an allyl group, an isopropenyl group, and a butenyl group. Preferred examples include a methyl group, an ethyl group, an n-propyl group, an isopropyl group, an n-butyl group, a t-butyl group, and a heptyl group, and a methyl group is more preferred. Furthermore, specific examples of the monovalent aromatic hydrocarbon group having 6 to 12 carbon atoms include aryl groups such as a phenyl group, a tolyl group, a xylyl group, and a naphthyl group; and aralkyl groups such as a benzyl group, a 2-phenylethyl group, and a 2-phenylpropyl group. Preferred examples include a phenyl group, a benzyl group, a 2-phenylethyl group, and a 2-phenylpropyl group, and a phenyl group is more preferred.

In regard to the various units that exist plural times in Formula (1), in which the numbers of times are represented by p, n and q, the repeating units include a block unit structure and/or a random unit structure.

Formula (1) includes the following structure:

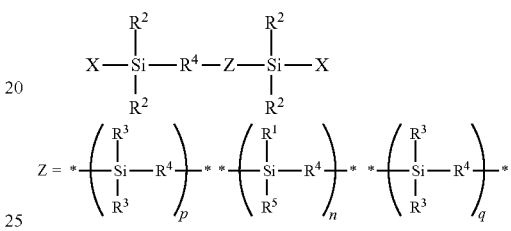

wherein Z is linked by the units of p, n, and q; and the position * of each unit is linked to another unit, or to $R^4$ or Si at a terminal of Formula (1).

$R^4$ represents an oxygen atom or a divalent hydrocarbon group represented by the following Formula (2):

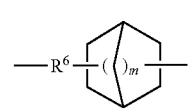

wherein in Formula (2), $R^6$ represents a single bond or an alkylene group having 1 to 6 carbon atoms; and m represents an integer from 0 to 2.

$R^6$ represents a single bond or an alkylene group having 1 to 6 carbon atoms. Specific examples thereof include a methylene group, an ethylene group, a propylene group, an isopropylene group, a butylene group, an isobutylene group, a pentylene group, and a hexylene group. Among these alkylene groups, an ethylene group and a propylene group are particularly preferred from the viewpoints of low gas permeability and strength of the cured product.

m represents an integer from 0 to 2, and m is preferably 1 or 2.

In Formula (1), $R^5$ represents a group represented by the following Formula (3) or the Formula (4) as mentioned later.

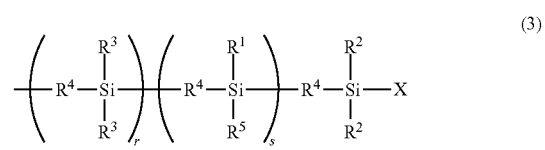

In Formula (3), $R^1$, $R^2$, $R^3$, and $R^4$ have the same meanings as described above; r and s each represent an integer from 0 to 10; and X represents an epoxy group represented by Formula (5) as mentioned later.

r represents an integer from 0 to 10, and r is preferably an integer from 0 to 3, and more preferably 1. s represents an integer from 0 to 10, and s is preferably an integer from 0 to 3, and more preferably 1.

In regard to the various units that exist plural times in Formula (3), in which the numbers of times are represented by r and s, the repeating units include a block unit structure or a random unit structure.

Formula (3) contains the following structure:

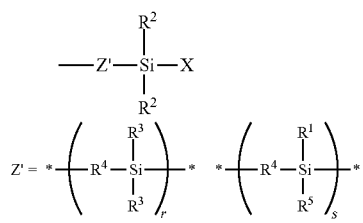

wherein Z' is linked by the units of r and s; and the position * of each unit is linked to another unit, or to $R^4$ at a terminal of Formula (3) or Si of Formula (1).

In Formula (4), $R^2$, $R^4$, and X have the same meanings as described above.

In Formula (5), $R^7$ represents a single bond, or an alkylene group having 1 to 6 carbon atoms and optionally contains an ester bond or an ether bond; and m has the same meaning as described above.

$R^7$ represents a single bond, or an alkylene group having 1 to 6 carbon atom and optionally containing an ester bond or an ether bond. Specific examples thereof include an ethylene group, a propylene group, an isopropylene group, a butylene group, an isobutylene group, a pentylene group, a hexyl group, an ethylene ester group, a propylene ester group, a butylene ester group, a pentylene ester group, an isopropylene ester group, an isobutylene ester group, an ethylene ether group, a propylene ether group, a butylene ether group, a pentylene ether group, and a hexylene ether group. Among these alkylene groups, an ethylene group and a propylene group are particularly preferred from the viewpoints of low gas permeability and strength of the cured product.

In Formula (1), n represents an integer from 1 to 10, and p and q each represent an integer from 0 to 10.

n is preferably an integer from 1 to 5, and particularly preferably 1 to 3, from the viewpoints of low gas permeability and strength of the cured product. p and q are each preferably an integer from 0 to 3, and particularly preferably 0 to 2, from the viewpoints of low gas permeability and strength of the cured product.

The silicone-modified epoxy resin of the present invention may be produced by oxidizing its precursor, an olefin-based resin. Examples of the techniques for oxidation include, but are not limited to, a method of oxidizing a resin using a peracid such as peracetic acid; a method of oxidizing a resin using aqueous hydrogen peroxide; and a method of oxidizing a resin using air (oxygen).

Specific examples of the technique for epoxidation using a peracid include the technique described in JP 2006-52187 A. Examples of the peracid that may be used include organic acids such as formic acid, acetic acid, propionic acid, maleic acid, benzoic acid, m-chlorobenzoic acid, and phthalic acid; and acid anhydrides thereof. Among these, from the viewpoints of the efficiency to react with hydrogen peroxide to produce an organic peracid, reaction temperature, convenience of operation, economic efficiency, and the like, it is preferable to use formic acid, acetic acid, or phthalic anhydride. Particularly, from the viewpoint of the convenience of the reaction operation, it is more preferable to use formic acid or acetic acid.

In regard to the technique of epoxidation using aqueous hydrogen peroxide, various techniques may be applied. However, specifically, the techniques mentioned in JP 59-108793 A, JP 62-234550 A, JP 5-213919 A, JP 11-349579 A, JP 1-33471 B, JP 2001-17864 A, JP 3-57102 B, and the like may be applied.

In addition to these, the method described in Non-Patent Literature 1 (James V. Crivello and Ramesh Narayan, Novel Epoxynorbornane Monomers. 1. Synthesis and Characterization, Macromolecules 1996, Vol. 29, pp. 433-438) may also be used. Specifically, the silicone-modified epoxy resin may be obtained by epoxidizing an alkenyl group using OXONE.

Hereinafter, particularly preferable methods for obtaining the present epoxy resin will be described as examples.

<(A) Silicone-Modified Epoxy Resin>

Regarding the present silicone-modified epoxy resin, an epoxidation reaction between an olefin-based compound, which is a precursor of the present silicone-modified epoxy resin, a polyacid compound, and a quaternary ammonium salt, is carried out in two layers of an organic solvent and aqueous hydrogen peroxide.

The polyacid compound used for the present invention is not particularly limited as long as it is a compound having a polyacid structure; however, a polyacid compound containing tungsten or molybdenum is preferred, a polyacid compound containing tungsten is more preferred, and a tungstic acid salt is particularly preferred.

Specific examples of the polyacid and polyacid salt that are included in the polyacid compound include a tungsten-based acid selected from tungstic acid, 12-tungstophosphoric acid, 12-tungstoboric acid, 18-tungstophosphoric acid, and 12-tungstosilicic acid; a molybdenum-based acid selected from molybdic acid and phosphomolybdic acid; and salts thereof.

Counter cations of these salts include ammonium ions, alkaline earth metal ions, alkali metal ions, and the like.

Specific examples include, but are not limited to, alkaline earth metal ions such as calcium ion and magnesium ion; and alkali metal ions such as sodium, potassium, and cesium ions. Particularly preferred examples of the counter cations include sodium ion, potassium ion, calcium ion, and ammonium ion.

The amount of use of the polyacid compound is 1.0 millimoles to 20 millimoles, preferably 2.0 millimoles to 20 millimoles, and more preferably 2.5 millimoles to 10 millimoles, in terms of metal elements (mole number of tungsten atoms in the case of tungstic acid, and mole number of molybdenum atoms in the case of molybdic acid), relative to 1 mol of the alkenyl group in the present olefin-based compound (functional group equivalent).

Regarding the quaternary ammonium salt, a quaternary ammonium salt having a total number of carbon atoms of 10 or more, preferably 25 to 100, and more preferably 25 to 55, may be preferably used, and particularly, a quaternary ammonium salt in which the alkyl chains are all aliphatic chains is preferred.

Specific examples thereof include, but are not limited to, a tridecanylmethylammonium salt, a dilauryldimethylammonium salt, a trioctylmethylammonium salt, a trialkylmethyl (a mixed type of a compound having octyl groups as the alkyl groups, and a compound having decanyl groups as the alkyl groups)-ammonium salt, a trihexadecylmethylammonium salt, a trimethylstearylammonium salt, a tetrapentylammonium salt, a cetyltrimethylammonium salt, a benzyltributylammonium salt, a dicetyldimethylammonium salt, a tricetylmethylammonium salt, and a di-hardened beef tallow alkyl-dimethylammonium salt.

Furthermore, regarding the anion species of these salts, a carboxylic acid ion is used. Preferred examples of the carboxylic acid ion include acetic acid ion, carbonic acid ion, and formic acid ion. Acetic acid ion is particularly preferred.

If the number of carbon atoms of the quaternary ammonium salt is more than 100, the quaternary ammonium salt becomes too hydrophobic, and the solubility in an organic layer may become poor. On the other hand, if the number of carbon atoms of the quaternary ammonium salt is less than 10, the quaternary ammonium salt becomes strongly hydrophilic, and similarly, the compatibility with an organic layer may become poor.

Quaternary ammonium salts generally include residual halogens. According to the present invention, the amount of halogens is particularly 1% by weight or less, more preferably 1000 ppm or less, and even more preferably 700 ppm or less. If the total amount of halogens is more than 1% by weight, halogens would remain in a large quantity in the product, and therefore, it is not preferable.

Regarding the amounts of use of the tungstic acid compound and a carboxylic acid salt of a quaternary ammonium, the amount of use of the carboxylic acid salt is preferably 0.01-fold to 0.8-fold equivalent, or 1.1-fold to 10-fold equivalent, of the valence of the tungstic acid compound used. The amount of use is more preferably 0.05-fold to 0.7-fold equivalent, or 1.2-fold to 6.0-fold equivalent, and even more preferably 0.05-fold to 0.5-fold equivalent, or 1.3-fold to 4.5-fold equivalent.

For example, since tungstic acid is $H_2WO_4$ and is divalent, the amount of use of the carboxylic acid salt of a quaternary ammonium relative to 1 mol of tungstic acid is preferably in the range of 0.02 mol to 1.6 mol, or 2.2 mol to 20 mol. Furthermore, if tungstophosphoric acid is used, since this acid is trivalent, similarly, the amount of use of the carboxylic acid salt is preferably 0.03 mol to 2.4 mol, or 3.3 mol to 30 mol. If silicotungstic acid is used, since this acid is tetravalent, the amount of use of the carboxylic acid salt is preferably 0.04 mols to 3.2 mol, or 4.4 mol to 40 mol.

In a case in which the amount of the carboxylic acid salt of a quaternary ammonium is lower than 1.1-fold equivalent of the valence of the tungstic acid compound, there is a problem that the epoxidation reaction proceeds with difficulty (depending on cases, the reaction proceeds faster), and side products are likely to be generated. In a case in which the amount of the carboxylic acid salt is larger than 10-fold equivalent, not only the treatment of excess carboxylic acid salt of a quaternary ammonium salt is difficult, but also the carboxylic acid salt has a function of suppressing the reaction, which is not preferable.

Regarding the quaternary ammonium salt using a carboxylic acid ion as the anion, a commercially available product may be used, or the quaternary ammonium salt may also be produced by, for example, a method of treating a raw material quaternary ammonium salt with a metal hydroxide or an ion-exchange resin, converting the quaternary ammonium salt to a quaternary ammonium hydroxide, and further reacting the quaternary ammonium hydroxide with various carboxylic acids, or the like. Examples of the raw material quaternary ammonium salt include halides and various metal salts of quaternary ammoniums. Also, if a suitable quaternary ammonium hydroxide is available, this may also be used.

Regarding a buffer solution, any buffer solution may be used; however, it is preferable to use an aqueous solution of a phosphoric acid salt for the reaction. Regarding the pH, a buffer solution that has been adjusted between pH 4 and pH 10 is preferred, and a buffer solution adjusted between pH 5 and pH 9 is more preferred. In a case in which the pH is below 4, the hydrolysis reaction of epoxy groups and the polymerization reaction may easily proceed. Also, in a case in which the pH is above 10, the reaction becomes extremely slow, and there is a problem that the reaction time becomes too long.

Particularly, according to the present invention, it is preferable that the pH is adjusted such that when a tungstic acid compound that serves as a catalyst is dissolved, the pH is between 5 and 9.

Regarding the method for using a buffer solution, for example, in the case of an aqueous solution of phosphoric acid-phosphoric acid salt, which is a preferable buffer solution, a method of using 0.1 mol % to 10 mol % equivalent of phosphoric acid (or a phosphoric acid salt such as sodium dihydrogen phosphate) with respect to hydrogen peroxide, and adjusting the pH with a basic compound (for example, sodium hydroxide, potassium hydroxide, sodium carbonate, sodium hydrogen carbonate, or potassium carbonate), may be used. Here, regarding the pH, it is preferable to add hydrogen peroxide such that the pH described above is obtained when hydrogen peroxide is added. Furthermore, the pH may also be adjusted using sodium dihydrogen phosphate, disodium hydrogen phosphate, or the like. A preferred concentration of a phosphoric acid salt is 0.1% to 60% by weight, and preferably 5% to 45% by weight.

Furthermore, in regard to the present reaction, a phosphoric acid salt such as disodium hydrogen phosphate, sodium dihydrogen phosphate, sodium phosphate, or sodium tripolyphosphate (or a hydrate thereof) may also be directly added to the reaction without using a buffer solution and without pH adjustment. In view of simplification of the process, there is no inconvenience of pH adjustment, and the direction addition is particularly preferable. The amount of use of the phosphoric acid salt in this case is usually 0.1 mol % to 5 mol % equivalent, preferably 0.2 mol % to 4 mol % equivalent, and more preferably 0.3 mol % to 3 mol % equivalent, with respect to hydrogen peroxide. At this time, if the amount of use is more than 5 mol % equivalent with respect to hydrogen peroxide, pH adjustment is needed. In a case in which the amount of use is less than 0.1 mol % equivalent, there may be adverse effects such as that hydrolysis of the epoxy resin thus produced may easily proceed, or the reaction may be prolonged.

Regarding the hydrogen peroxide used for the present reaction, in view of the convenience of handling, an aqueous solution having a hydrogen peroxide concentration of 10% to 40% by weight is preferable. In a case in which the concentration is more than 40% by weight, handling may become difficult, and a decomposition reaction of the epoxy resin thus produced may easily proceed, which is not preferable.

The present reaction uses an organic solvent. The amount of the organic solvent used is, as a weight ratio, 0.3 to 10, preferably 0.3 to 5, and more preferably 0.5 to 2.5, with respect to 1 of the olefin-based compound, which is a reaction substrate. When the weight ratio is more than 10, the reaction proceeds extremely slowly, and it is not preferable. Specific examples of the organic solvent that may be used include alkanes such as hexane, cyclohexane, and heptane; aromatic hydrocarbon compounds such as toluene and xylene; and alcohols such as methanol, ethanol, isopropanol, butanol, hexanol, and cyclohexanol. Furthermore, depending on the case, ketones such as methyl ethyl ketone, methyl isobutyl ketone, cyclopentanone, and anone; ethers such as diethyl ether, tetrahydrofuran, and dioxane; ester compounds such as ethyl acetate, butyl acetate, and methyl formate; and nitrile compounds such as acetonitrile may also be used.

Regarding a specific method for reaction operation, for example, when the reaction is carried out in a batch type reaction pot, an olefin-based compound, hydrogen peroxide (aqueous solution), a polyacid compound (catalyst), a buffer solution, a quaternary ammonium salt, and an organic solvent are introduced into the reaction pot, and the mixture is stirred in two layers. There are no particular limitations on the stirring speed. In many cases, heat is generated at the time of addition of hydrogen peroxide. Therefore, a method of slowly adding hydrogen peroxide after each component has been added, may also be used.

The reaction temperature is not particularly limited; however, the reaction temperature is preferably 0° C. to 90° C., more preferably 0° C. to 75° C., and particularly preferably 15° C. to 60° C. In a case in which the reaction temperature is too high, a hydrolysis reaction is prone to proceed, and if the reaction temperature is low, the reaction rate is extremely slowed.

Furthermore, the reaction time may vary depending on the reaction temperature, the amount of catalyst, and the like; however, from the viewpoint of industrial production, a reaction taking a long time consumes enormous energy, and therefore, it is not preferable. A preferred range of the reaction time is 1 hour to 48 hours, preferably 3 hours to 36 hours, and more preferably 4 hours to 24 hours.

After completion of the reaction, a quenching treatment for excess hydrogen peroxide is performed. It is preferable to perform the quenching treatment using a basic compound. Furthermore, it is also preferable to use a reducing agent and a basic compound in combination. Regarding a preferred treatment method, a method of neutrally adjusting the pH 6 to 12 with a basic compound, and then quenching residual hydrogen peroxide using a reducing agent, may be used. In a case in which the pH is below 6, heat generation occurs to a large extent when excess hydrogen peroxide is reduced, and there is a possibility of producing decomposition products.

Examples of the reducing agent include sodium sulfite, sodium thiosulfate, hydrazine, oxalic acid, and vitamin C. The amount of use of the reducing agent is usually 0.01 times to 20 times by mole, more preferably 0.05 times to 10 times by mole, and even more preferably 0.05 times to 3 times by mole, relative to the number of moles of the excess amount of hydrogen peroxide.

Examples of the basic compound include a metal hydroxide such as sodium hydroxide, potassium hydroxide, magnesium hydroxide, or calciumhydroxide; a metal carbonate such as sodium carbonate or potassium carbonate; a phosphoric acid salt such as sodium phosphate or sodium hydrogen phosphate; and basic solids such as ion-exchange resins or alumina.

Regarding the amount of use of the basic compound, if the basic compound is soluble in water or an organic solvent (for example, various solvents, including an aromatic hydrocarbon such as toluene or xylene; a ketone such as methyl isobutyl ketone, or methyl ethyl ketone; a hydrocarbon such as cyclohexane, heptane, or octane; and an alcohol such as methanol, ethanol, or isopropyl alcohol), the amount of use thereof is usually 0.01 times to 20 times by mole, more preferably 0.05 times to 10 times by mole, and even more preferably 0.05 times to 3 times by mole, relative to the number of moles of the excess amount of hydrogen peroxide. These basic compounds may be added as solutions in water or the above-mentioned organic solvents, or may be added as single substances.

In the case of using a solid base that does not dissolve in water or an organic solvent, it is preferable to use the solid base in an amount of 1 time to 1,000 times as a weight ratio, with respect to the amount of hydrogen peroxide remaining in the system. The amount is more preferably 10 times to 500 times, and even more preferably 10 times to 300 times. In the case of using a solid base that does not dissolve in water or an organic solvent, it is still acceptable to perform the treatment after separation of an aqueous layer and an organic layer that will be described below.

After quenching of hydrogen peroxide (or before quenching is performed), in a case in which an organic layer and an aqueous layer are not separated, or in a case in which an organic solvent is not used, an operation of adding the organic solvents described above is performed, and extraction of a reaction product from the aqueous layer is performed. The organic solvent used in this case is 0.5 times to 10 times, and preferably 0.5 times to 5 times, as a weight ratio, with respect to the raw material olefin-based compound. After this operation is repeated several times as necessary, the organic layer is separated, and if necessary, the organic layer is purified by washing with water.

The organic layer thus obtained is subjected to removal of impurities as necessary, by means of an ion-exchange resin or a metal oxide (particularly, silica gel, alumina, or the like is preferred), activated carbon (above all, chemically activated carbon is particularly preferred), a composite metal salt (above all, a basic composite metal salt is particularly preferred), a clay mineral (above all, a layered clay mineral such as montmorillonite is particularly preferred), or the like. The organic layer is further subjected to water washing, filtration and the like, and then the solvent is distilled off. Thus, the intended silicone-modified epoxy compound is obtained. Depending on cases, the silicone-modified epoxy compound may be further purified by column chromatography or distillation.

The olefin-based compound, which is a precursor of the present silicone-modified epoxy resin (A), is represented by Formula (10).

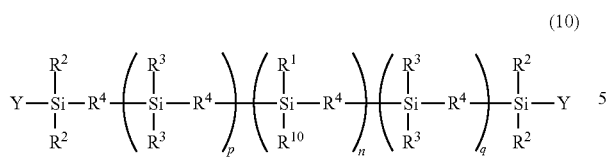
(10)

In Formula (10), $R^1$ to $R^4$, n, p, and q respectively have the meanings as described above; $R^{10}$ represents a group represented by the following Formula (11) or Formula (12); and Y represents an alkenyl group represented by the following Formula (13).

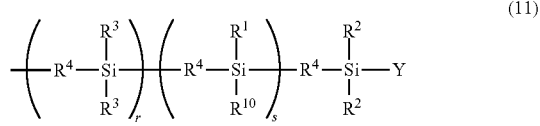
(11)

In Formula (11), $R^1$ to $R^4$, $R^{10}$, r, and s respectively have the same meanings as described above; and Y represents a structure represented by the following Formula (13).

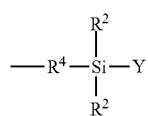
(12)

In Formula (12), $R^2$, $R^4$, and Y respectively have the same meanings as described above.

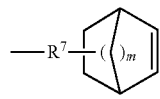
(13)

In Formula (13), $R^7$ and m respectively have the same meanings as described above.

The olefin-based compound represented by Formula (10) may be produced by, for example, subjecting one or more organosilicon compounds represented by the following Formula (7), each having SiH groups at the terminals of the molecule, and a compound represented by the following Formula (14), having terminal alkenyl groups, to a hydrosilylation reaction in the presence of a platinum catalyst.

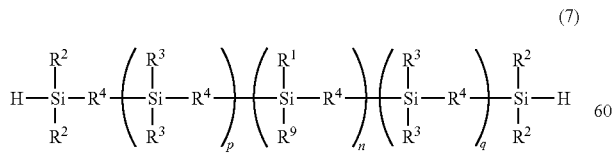
(7)

In Formula (7), $R^1$ to $R^4$, p, n, and q respectively have the same meanings as described above; and $R^9$ represents a group represented by the following Formula (8) or Formula (9).

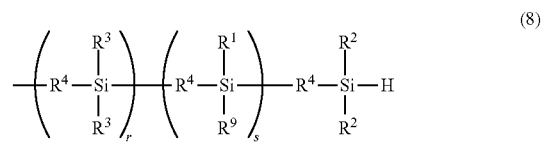
(8)

In Formula (8), $R^1$ to $R^4$, $R^9$, r, and s respectively have the same meanings as described above.

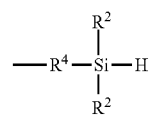
(9)

In Formula (9), $R^2$ and $R^4$ respectively have the same meanings as described above.

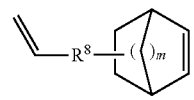
(14)

In Formula (14), m has the same meaning as described above, and $R^8$ represents an alkylene group having 0 to 4 carbon atoms, which may contain an ester moiety or an ether moiety. Specific examples thereof include a methylene group, an ethylene group, a propylene group, an isopropylene group, a butylene group, an isobutylene group, a methylene ester group, an ethylene ester group, a propylene ester group, an isobutylene ester group, a methylene ether group, an ethylene ether group, a propylene ether group, and a butylene ether group. Among these alkylene groups, a carbon number of 0 or a methylene group is particularly preferred from the viewpoints of low gas permeability and strength of the cured product.

Specific examples of the compound having terminal alkenyl groups (14) may include, but not limited to, compounds represented by the following Formulas (15) to (17):

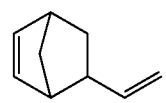
(15)

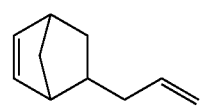
(16)

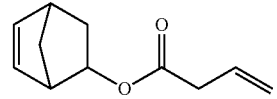
(17)

In this way, the olefin-based compound represented by Formula (10) may be obtained.

Thereafter, the olefin-based compound (10) thus obtained is epoxidized by the epoxidation method described above, and thereby, the present silicone-modified epoxy resin may be obtained.

Furthermore, as another technique, the present silicone-modified epoxy resin may also be obtained by subjecting an epoxy group-containing compound containing terminal alkenyl groups as represented by the following Formula (6):

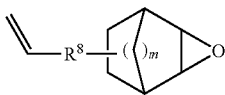
(6)

and one or more organosilicon compounds each having SiH groups at the ends of the molecule as described above, to a hydrosilylation reaction.

Here, $R^8$ and m in Formula (6) respectively have the same meanings as described above.

Examples of the compound represented by Formula (6) may include, but not limited to, epoxy group-containing compounds represented by the following Formulas (18) to (20), each containing terminal alkenyl groups:

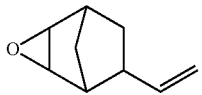
(18)

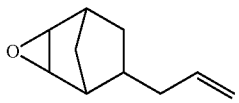
(19)

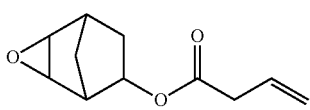
(20)

Here, regarding the organosilicon compound having terminal SiH groups, a compound represented by Formula (7) described above may be directly used, and also, the organosilicon compound may be obtained by reacting a compound represented by formula (7) described above with a compound represented by Formula (14) described above.

The present silicone-modified epoxy resin may be obtained by reacting, as described above, a compound represented by Formula (7) described above and a compound represented by Formula (14) described above to obtain an intermediate, and then reacting the intermediate with a compound represented by Formula (6) described above. Alternatively, an intended epoxy resin may also be obtained by reacting compounds represented by Formula (7), Formula (14), and Formula (6) described above all at once. Alternatively, an intended epoxy resin may also be obtained by reacting a compound represented by Formula (7) with a compound represented by Formula (6).

Furthermore, the epoxy group-containing compound containing terminal alkenyl groups may be obtained by oxidizing the compound having terminal alkenyl groups by the method for oxidizing an olefin-based resin as described above.

The epoxy equivalent of the silicone-modified epoxy resin (A) obtainable in this manner is preferably 150 g/eq. to 1,500 g/eq., more preferably 160 g/eq. to 1,400 g/eq., even more preferably 170 g/eq. to 1,200 g/eq., and particularly preferably 180 g/eq. to 1,000 g/eq. In a case in which the epoxy equivalent is less than 150 g/eq., the cured product tends to become too hard, and in a case in which the epoxy equivalent is more than 1,500 g/eq., the mechanical characteristics of the cured product tends to be deteriorated, which is not preferable. Furthermore, it is preferable that the silicone-modified epoxy resin is liquid.

The epoxy equivalent may be determined by the method described in JIS K7236, or by $^1$H-NMR, $^{13}$C-NMR, $^{29}$Si-NMR, an elemental analysis, or the like.

<(B) Curing Agent>

Regarding the curing agent, a curing agent having a functional group having reactivity with an epoxy group is used. Examples thereof may include, but not limited to, an amine-based curing agent, a phenolic curing agent, an acid anhydride curing agent, and a polyvalent carboxylic acid resin. Among them, an acid anhydride curing agent and a polyvalent carboxylic acid resin are preferred. Examples of the acid anhydride curing agent may include, but not limited to, phthalic anhydride, maleic anhydride, trimellitic anhydride, pyromellitic anhydride, hexahydrophthalic anhydride, 3-methylhexahydrophthalic anhydride, 4-methylhexahydrophthalic anhydride, a mixture of 3-methylhexahydrophthalic anhydride and 4-methylhexahydrophthalic anhydride, tetrahydrophthalic anhydride, nadic anhydride, methylnadic anhydride, norbornane-2,3-dicarboxylic acid anhydride, methylnorbornane-2,3-dicarboxylic acid anhydride, and 2,4-diethylglutaric anhydride. Among these, hexahydrophthalic anhydride and derivatives thereof are preferred.

Next, the polyvalent carboxylic acid resin will be described.

The polyvalent carboxylic acid resin (B) is a compound having at least two or more carboxyl groups and having an aliphatic hydrocarbon group or a siloxane skeleton as the main skeleton. According to the present invention, the polyvalent carboxylic acid resin includes not only a polyvalent carboxylic acid compound having a single structure, but also a mixture of plural compounds having different positions of substituents or different substituents, that is, a polyvalent carboxylic acid composition. According to the present invention, those are collectively referred to as polyvalent carboxylic acid resins.

The polyvalent carboxylic acid resin (B) is particularly preferably a bifunctional to hexafunctional carboxylic acid, and a compound obtained by a reaction between a bifunctional to hexafunctional, polyhydric alcohol having 5 or more carbon atoms or a polyhydric alcohol having a siloxane structure and an acid anhydride is more preferred. Furthermore, it is preferable that the acid anhydride is a polycarboxylic acid which is a saturated aliphatic cyclic acid anhydride.

Regarding the bifunctional to hexafunctional polyhydric alcohol, as an alcohol compound, there are no particular limitations as long as a compound has an alcoholic hydroxyl group, and examples thereof include diols such as ethylene glycol, propylene glycol, 1,3-propanediol, 1,2-butanediol, 1,4-butanediol, 1,5-pentanediol, 1,6-hexanediol, cyclohexanedimethanol, 2,4-diethylpentanediol, 2-ethyl-2-butyl-1,3-propanediol, neopentyl glycol, tricyclodecanedimethanol, and norbornenediol; triols such as glycerin, trimethylolethane, trimethylolpropane, trimethylolbutane, and 2-hydroxymethyl-1,4-butanediol; tetraols such as pentaerythritol and ditrimethylolpropane; and hexaols such as dipentaerythritol.

Particularly preferred alcohols are alcohols having 5 or more carbon atoms, and particularly, examples include compounds such as 1,6-hexanediol, 1,4-cyclohexanedimethanol, 1,3-cyclohexanedimethanol, 1,2-cyclohexanedimethanol, 2,4-diethylpentanediol, 2-ethyl-2-butyl-1,3-propanediol, neopentyl glycol, tricyclodecanedimethanol, and norbornenediol. Among them, alcohols having a branched structure or a cyclic structure, such as 2-ethyl-2-butyl-1,3-propanediol, neopentyl glycol, 2,4-diethylpentanediol, 1,4-cyclohexanedimethanol, tricyclodecanedimethanol, and norbornenediol are more preferred. From the viewpoint of maintaining a high illuminance retention ratio, 2,4-diethylpentanediol and tricyclodecanedimethanol are particularly preferred.

The polyhydric alcohol having a siloxane structure is not particularly limited; however, for example, a silicone oil represented by the following formula may be used.

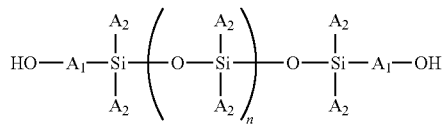

wherein $A_1$ represents an alkylene group having 1 to 10 carbon atoms in total, which may be interrupted by an ether bond; $A_2$ represents a methyl group or a phenyl group; and n represents a repeating unit and means an average value, while n is any number from 1 to 100.

Regarding the acid anhydride, particularly, methyltetrahydrophthalic anhydride, methylnadic anhydride, nadic anhydride, hexahydrophthalic anhydride, methylhexahydrophthalic anhydride, butanetetracarboxylic acid anhydride, bicyclo[2,2,1]heptane-2,3-dicarboxylic acid anhydride, methylbicyclo[2,2,1]heptane-2,3-dicarboxylic acid anhydride, cyclohexane-1,3,4-tricarboxylic acid-3,4-anhydride, and the like are preferred. Among them, methylhexahydrophthalic anhydride and cyclohexane-1,3,4-tricarboxylic acid-3,4-anhydride are preferred. Here, in order to increase hardness, cyclohexane-1,3,4-tricarboxylic acid-3,4-anhydride is preferred, and in order to increase the illuminance retention ratio, methylhexahydrophthalic anhydride is preferred.

The conditions for the addition reaction are not particularly limited; however, regarding one of specific reaction conditions, a technique of reacting an acid anhydride with a polyhydric alcohol at 40° C. to 150° C. under catalyst-free and solvent-free conditions, heating the mixture, and after completion of the reaction, taking out the product as received, may be used. However, the conditions are not limited to the present reaction conditions.

A polycarboxylic acid obtainable in this manner is particularly preferably a compound represented by the following formula:

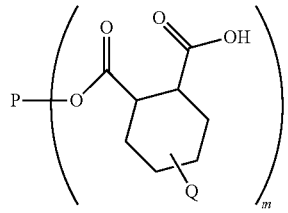

wherein Q that exists plural times in the formula represents at least one of a hydrogen atom, a methyl group, and a carboxyl group; P represents a linear or cyclic aliphatic group having 2 to 20 carbon atoms, which is derived from the polyhydric alcohol described above; and m represents a number from 2 to 4.

The present resin composition preferably includes an acid anhydride. Specific examples of the acid anhydride include acid anhydrides such as phthalic anhydride, trimellitic anhydride, pyromellitic anhydride, maleic anhydride, tetrahydrophthalic anhydride, methyltetrahydrophthalic anhydride, methylnadic anhydride, nadic anhydride, hexahydrophthalic anhydride, methylhexahydrophthalic anhydride, butanetetracarboxylic acid anhydride, bicyclo[2,2,1]heptane-2,3-dicarboxylic acid anhydride, methylbicyclo[2,2,1]heptane-2,3-dicarboxylic acid anhydride, and cyclohexane-1,3,4-tricarboxylic acid-3,4-anhydride.

Particularly, methyltetrahydrophthalic anhydride, methylnadic anhydride, nadic anhydride, hexahydrophthalic anhydride, methylhexahydrophthalic anhydride, butanetetracarboxylic acid anhydride, bicyclo[2,2,1]heptane-2,3-dicarboxylic acid anhydride, methylbicyclo[2,2,1]heptane-2,3-dicarboxylic acid anhydride, cyclohexane-1,3,4-tricarboxylic acid-3,4-anhydride, and the like are preferred.

Particularly preferably, hexahydrophthalic anhydride, methylhexahydrophthalic anhydride, and cyclohexane-1,3,4-tricarboxylic acid-3,4-anhydride, which are represented by the following Formula (10):

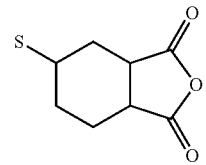 [SMILES: O=C1OC(=O)C2CC(S)CCC12]

wherein S in the formula represents at least one of a hydrogen atom, a methyl group, and a carboxyl group, are preferred, and among them, methylhexahydrophthalic anhydride and cyclohexane-1,3,4-tricarboxylic acid-3,4-anhydride are preferred.

It is preferable that the polyvalent carboxylic acid resin (B) and an acid anhydride are used in combination, and in the case of being used in combination, the use ratio of the components is preferably in the following range:

$$W1/(W1+W2)=0.05 \text{ to } 0.70$$

provided that W1 represents the parts by weight of incorporation of the polyvalent carboxylic acid resin (B); and W2 represents the parts by weight of incorporation of the acid anhydride. The range of W1/(W1+W2) is more preferably 0.05 to 0.60, even more preferably 0.10 to 0.55, and particularly preferably 0.15 to 0.4. If the use ratio is below 0.05, the acid anhydride tends to be volatilized to a large extent at the time of curing, which is not preferable. If the use ratio is more than 0.70, the composition becomes highly viscous, and handling is made difficult. In a case in which no acid anhydride is incorporated (excluding the cases in which a small amount of the acid anhydride remains), the form of the epoxy resin becomes solid or in a state of being close to solid, or becomes crystalline. Therefore, there is no problem.

In a case in which the polyvalent carboxylic acid resin (B) and an acid anhydride are used in combination, a technique of producing the polyvalent carboxylic acid resin (B) in an excess of the acid anhydride at the time of producing the polyvalent carboxylic acid resin (B), and thus making a mixture of the polyvalent carboxylic acid (B) and the acid anhydride, is also preferable from the viewpoint of convenience of the operation.

The amount of incorporation of the curing agent of Component (B) is an amount in which the amount of the functional group having reactivity with an epoxy group (in the case of an acid anhydride curing agent, an acid anhydride group represented by —CO—O—CO—) is 0.3 mol to 1.0 mol, and preferably 0.4 mol to 0.8 mol, relative to 1 mol in total of epoxy groups in Component (A). When the amount of the functional group having reactivity with an epoxy group is 0.3 mol or more, heat resistance and transparency of the cured product are enhanced, which is desirable. When the amount of the functional group having reactivity with an epoxy group is 1.0 mol or less, mechanical characteristics of the cured product are enhanced, which is preferable. Here, the "functional group having reactivity with an epoxy group" means an amino group of an amine-based curing agent, a phenolic hydroxyl group of a phenolic curing agent, an acid anhydride group of an acid anhydride curing agent, or a carboxyl group of a polyvalent carboxylic acid resin.

<(C) Curing Catalyst>

Examples of the curing catalyst include quaternary phosphonium salts such as tetrabutylphosphonium O,O-diethyl phosphorodithioate and tetraphenylphosphonium tetraphenyl borate; organic phosphine-based curing catalysts such as triphenylphosphine and diphenylphosphine; tertiary amine-based curing catalysts such as 1,8-diazabicyclo(5,4,0)undecene-7, triethanolamine, and benzyldimethylamine; quaternary ammonium salts such as 1,8-diazabicyclo(5,4,0) undecene-7 phenol salt, 1,8-diazabicyclo(5,4,0)undecene-7 octylate, 1,8-diazabicyclo(5,4,0)undecene-7 p-toluenesulfonate, and 1,8-diazabicyclo(5,4,0)undecene-7 formate; organic carboxylic acid salts such as zinc octylate and zinc naphthylate; aluminum chelate compounds such as aluminum bis(ethyl acetoacetate) monoacetylacetonate and aluminum (ethyl acetoacetate) diisopropylate; and imidazoles such as 2-methylimidazole and 2-phenyl-4-methylimidazole. Preferred examples are quaternary phosphonium salts and quaternary ammonium salts.

The amount of incorporation of the (C) curing catalyst is 0.01 parts to 3 parts by mass, and preferably 0.05 parts to 1.5 parts by mass, relative to 100 parts by mass of the sum of Component (A) and Component (B). If the amount of incorporation of the curing catalyst is smaller than the lower limit described above, there is a risk that the effect of accelerating the reaction between the epoxy resin and the curing agent may not be sufficient. In contrast, if the amount of incorporation of the curing catalyst is larger than the upper limit described above, there is a risk that the catalyst may cause discoloration at the time of curing or at the time of reflow testing.

In the present epoxy resin composition, an antioxidant may be added for the purpose of maintaining transparency of the cured product. Examples of the antioxidant include a phosphorous acid compound and a hindered phenolic antioxidant, and a hindered phenolic antioxidant is preferred. Furthermore, regarding an ultraviolet absorber, a hindered amine-based ultraviolet absorber is preferred. The amount of the antioxidant is 0.1 parts to 0.5 parts by mass, and preferably 0.1 parts to 0.3 parts by mass, relative to 100 parts by mass of Component (A). If the amount of incorporation of the antioxidant is more than the upper limit described above, residual antioxidant is precipitated at the surface of the resin after being cured, which is not preferable. If the amount is less than the lower limit described above, heat resistance and transparency are decreased.

<Other Components>

In addition to the various components described above, conventionally used additives, for example, an ultraviolet absorber, a deterioration inhibitor, a fluorophore, a thermal plasticizer, and a diluent may be used in combination as necessary.

The present photosemiconductor element sealing resin composition may be produced by blending the components described above, incorporating various additives as necessary, and dissolving or melt mixing the components. Melt mixing may be carried out by known methods. For example, the above-mentioned components may be introduced into a reactor, and melt mixed batchwise, or the components mentioned above may be introduced into a kneading machine such as a kneader or a hot three-roll and continuously melt mixed. It is preferable that the (C) curing catalyst is heated in advance and melt mixed with the (B) curing agent, and is dispersed and mixed with Component (A) and the like at the final stage of mixing.

EXAMPLES

Hereinafter, the present invention will be described in more detail by way of Synthesis Examples and Examples. Furthermore, the present invention is not intended to be limited to these Synthesis Examples and Examples. The various property values given in the Synthesis Examples and Examples were measured by the following methods. Here, the unit "parts" represents parts by mass, unless particularly stated otherwise.

○ GPC: GPC was performed under the conditions described below.
Various conditions for GPC
Manufacturer: Waters Corp.
Column: SHODEX GPC LF-G (guard column), KF-603, KF-602.5, KF-602, KF-601 (two columns)
Flow rate: 0.4 ml/min
Column temperature: 40° C.
Solvent use: THF (tetrahydrofuran)
Detector: RI (differential refractive index detector)
○ NMR: Analysis was performed using JNM-ECS400 manufactured by JEOL, Ltd., using a deuterated chloroform solvent.
○ Epoxy equivalent: Measurement was made by the method described in JIS K7236.

[Synthesis Example 1] Synthesis of Organopolysiloxane 1 Having SiH Groups

Phenyltrimethoxysilane (1.0 mol, 198.44 g) and 30 g of acetonitrile were mixed, and the internal temperature was cooled to 10° C. or lower. Then, 16 g of concentrated sulfuric acid was added dropwise thereto for 30 minutes, and then 81 g of water was added dropwise thereto for 1 hour. Subsequently, 1,1,3,3-tetramethyl-1,3-disiloxane (1.5 mol, 201.48 g) was added dropwise thereto for 30 minutes, and the mixture was stirred overnight. After waste acid was separated, 500 g of toluene was added to the reaction mixture, and the reaction mixture was washed three times with hot water, and two times with hot pure water. The toluene solution thus obtained was distilled under reduced pressure, and thereby, organopolysiloxane 1 comprising a compound represented by the following formula as a main component was obtained. The purity of organopolysiloxane 1 thus obtained was 97% (calculated from the peak area of the main component in the molecular weight distribution of GPC).

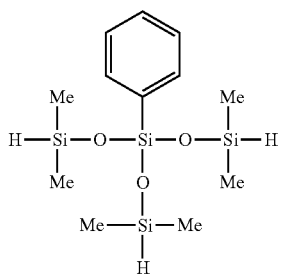

[Example 1] Synthesis of Olefin-Based Compound 1

Figure 2:
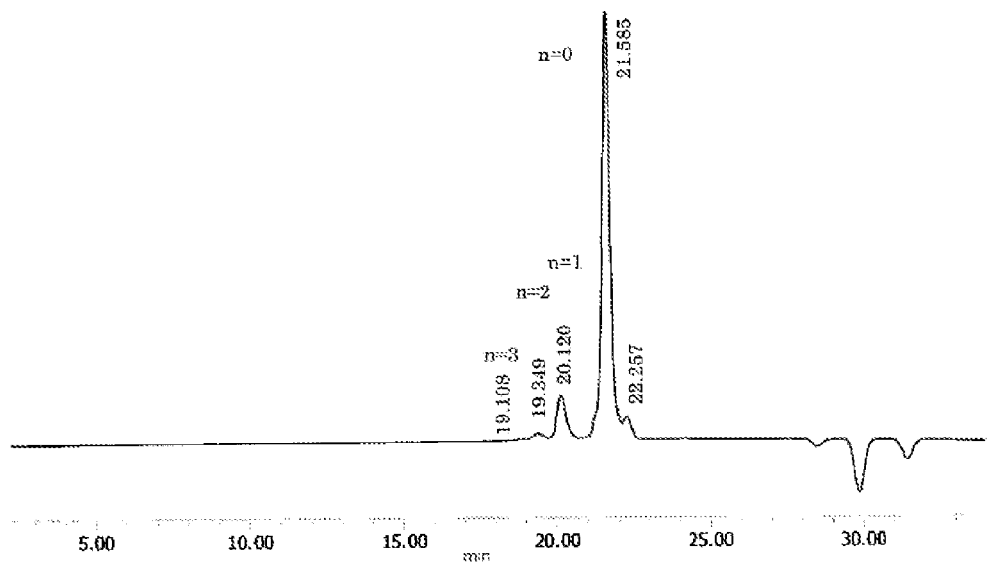
FIG. 2 is a GPC chart of polyolefin-based compound 1 obtained in Example 1.

A 1 L separable flask was charged with 5-vinyl-2-norbornene (1 mol, 132 g), 200 g of toluene, and 0.17 g of a 0.5 mass % toluene solution of chloroplatinic acid, and the internal temperature was increased to 90° C. Subsequently, organopolysiloxane 1 (0.1 mol, 33.07 g) synthesized in Example 1 was added dropwise thereto for 1 hour. After completion of the dropwise addition, the mixture was allowed to react for 4 hours at 110° C. The toluene solution thus obtained was distilled under reduced pressure, and thereby polyolefin-based compound 1 comprising a compound represented by the following formula as a main component was obtained. Polyolefin-based compound 1 thus obtained was checked by 1H-NMR, and the alkenyl equivalent was 0.370 mol/100 g. The 1H-NMR spectrum is shown in FIG. 1, and the GPC chart is shown in FIG. 2.

[Example 2] Synthesis of Silicone-Modified Epoxy Resin

A flask equipped with a stirring apparatus and a reflux cooling tube was charged with 100 g of the polyolefin-based compound (alkenyl equivalent 0.376 mol/100 g) obtained in Example 1, 200 g of toluene, 1 g of a 50 mass % xylene solution of trioctylmethylammonium acetate (manufactured by Lion Akzo Co., Ltd., TOMAA-50), 14 g of water, g parts of 12-tungstophosphoric acid n-hydrate, g parts of sodium tungstate dihydrate, and g parts of sodium dihydrogen phosphate dihydrate. While the mixture was stirred, the internal temperature was increased to 50±3° C. using a water bath. 95 Parts of 35 mass % aqueous hydrogen peroxide was added dropwise thereto for 1 hour, the internal temperature was maintained at 50±3° C., and the mixture was stirred for 47 hours. The progress of the reaction was checked by 1H-NMR, and the conversion rate from an alkenyl group to an epoxy group after completion of the reaction was >99%, while the raw material olefin peak had disappeared (1% or less).

Subsequently, heat was dissipated so as to decrease the internal temperature to 30° C., and then a 30 mass % aqueous solution of sodium hydroxide was added to the reaction liquid to adjust the reaction liquid to pH 9.5. Subsequently, 38 g of a 20 mass % aqueous solution of sodium thiosulfate was added thereto, and the reaction liquid was stirred for 30 minutes and was left to stand still. An organic layer was taken out from the reaction liquid that had separated into two layers, and 20 g of activated carbon (CPI manufactured by Ajinomoto Fine-Techno Co., Inc.) was added to this organic layer. The organic layer was stirred for 4 hours at room temperature, and then was filtered. The organic solvent of the filtrate thus obtained was distilled off, and thereby 209 g of silicone-modified epoxy resin (A-1) of the present invention comprising a compound represented by the following formula as a main component was obtained:

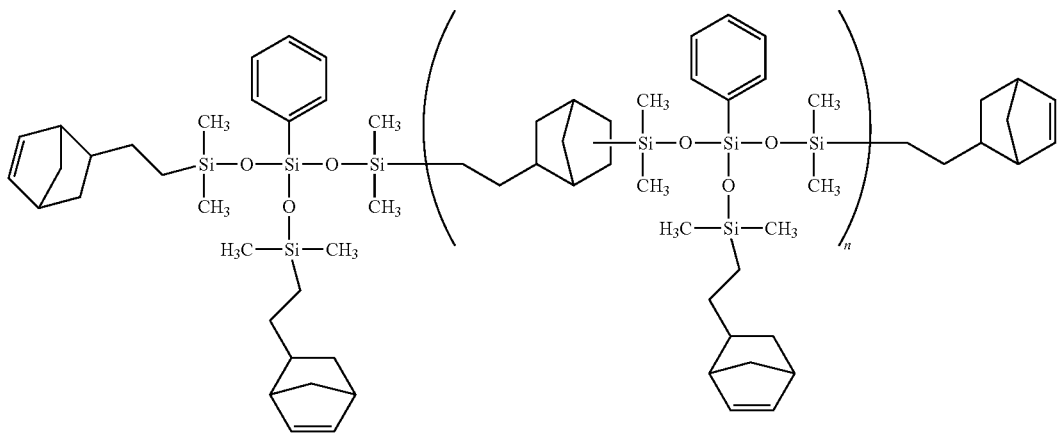

(n in the formula=0.12 based on the area ratio of GPC)

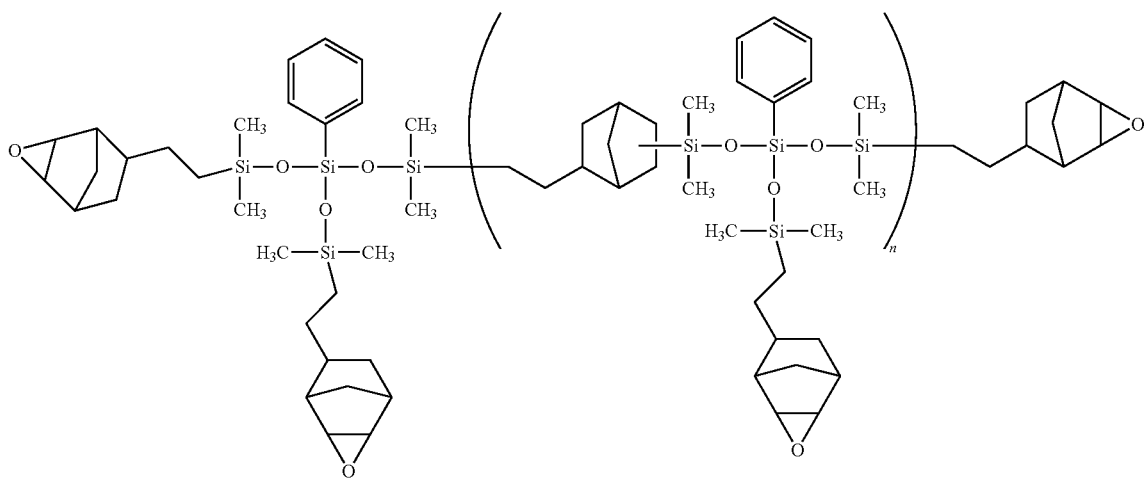

(n in the formula=0.18 from the area ratio of GPC).

Figure 3:
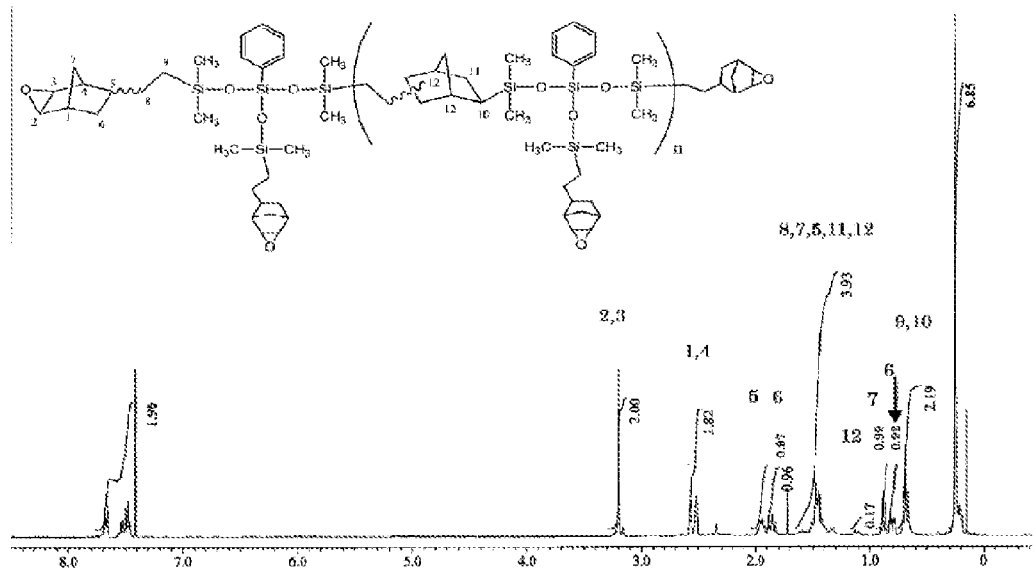
FIG. 3 is a $^1$H-NMR spectrum of silicone-modified epoxy resin (A-1) obtained in Example 2.
Figure 4:
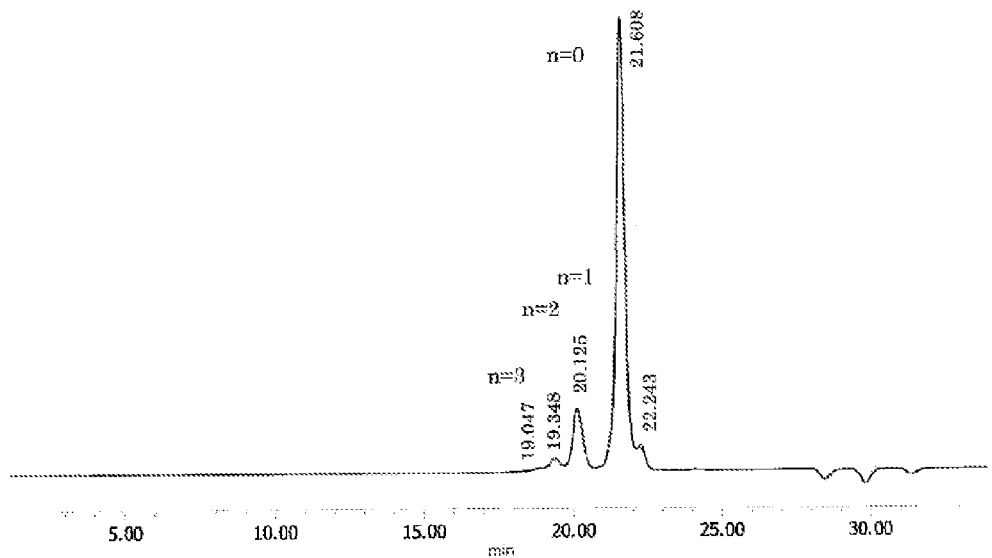
FIG. 4 is a GPC chart of silicone-modified epoxy resin (A-1) obtained in Example 2.

From the analysis results of $^1$H-NMR, it was confirmed that the epoxy resin comprised a compound having the skeleton of the formula described above at a proportion of >98%. Furthermore, according to the GPC measurement, the purity was >96%. The $^1$H-NMR spectrum is shown in FIG. 3, and the GPC chart is shown in FIG. 4.

The epoxy resin used in Comparative Examples is as follows.

[Comparative Example 11]
3'-4'-Epoxycyclohexylmethyl
3,4-epoxycyclohexanecarboxylate (Manufactured by Daicel Corp., CELLOXIDE 2021P)

[Synthesis Example 2] Synthesis of a Mixture of a Polycarboxylic Acid Resin and an Acid Anhydride Compound Used as a Curing Agent A flask equipped with a stirrer, a reflux cooling tube, and a stirring apparatus was charged, while purged with nitrogen, with 15 g of tricyclodecanedimethanol, 70 g of methylhexahydrophthalic anhydride (manufactured by New Japan Chemical Co., Ltd., trade name: RIKACID MH), and 15 g of cyclohexane-1,2,4-tricarboxylic acid-1,2-anhydride (manufactured by Mitsubishi Gas Chemical Co., Inc., trade name: H-TMAn), and the mixture was reacted for 3 hours at 40° C. Subsequently, heating and stirring was performed for 1 hour at 70° C. It was confirmed by GPC that tricyclodecanedimethanol had a peak area of 1 area % or less, and 100 g of a mixture of a polyvalent carboxylic acid resin and a carboxylic acid anhydride (B-1) was obtained. The mixture thus obtained was a colorless liquid resin, and the purity measured by GPC was 37 area % for the polyvalent carboxylic acid resin (following Formula P), 11 area % for cyclohexane-1,2,4-tricarboxylic acid-1,2-anhydride, and 52 area % for methyl hexahydrophthalic anhydride. The functional group equivalent was 171 g/eq.

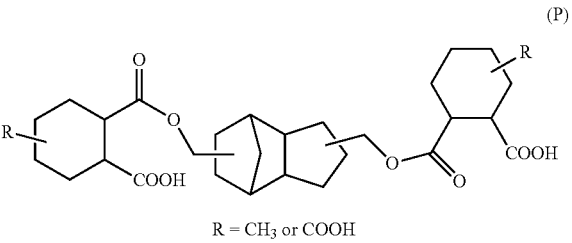

(P)

R = CH₃ or COOH

Preparation of Composition

Resin compositions were prepared based on the formulation (parts by mass) indicated in the following Table 1. As a result, epoxy resin compositions of Example 3 and Comparative Example 1 were obtained. The components in these tables are as follows. Furthermore, in the tables, a blank cell means "null (0)".

(C) Curing catalyst: quaternary phosphonium salt (manufactured by Nippon Chemical Industrial Co., Ltd., trade name: HISHICOLIN PX-4MP)

(D) Antioxidant: Pentaerythritol tetrakis[3-(3',5'-di-t-butyl-4'-hydroxyphenyl)propionate](manufactured by Adeka Corp., trade name: ADEKA STAB AO-60)

—Evaluation of Characteristics of Compositions and Cured Products—

Evaluation of the characteristics of the compositions and cured products thus obtained was carried out by the following methods. Curing was carried out by heating compositions for 1 hour at 100° C. and then for 4 hours at 150° C. The results are presented in Table 1.

(1) Viscosity

Viscosity was measured at 23° C. according to JIS K7233 using an E-type rotary viscometer manufactured by Toki Sangyo Co., Ltd.

(2) Hardness

Hardness was measured for a rod-shaped cured product (type D) according to JIS K6301.

(3) TMA (Tg, CTE)

TMA was carried out using a specimen having a size of 5 mm×15 mm and a thickness of 4 mm and using a TMA/SS-6100 manufactured by SII NanoTechnology, Inc.

(4) Water Vapor Permeability

The water vapor permeability of each cured product having a thickness of 0.5 mm was measured according to JIS K 7129.

TABLE 1

| Formulation | | Example 3 | Comparative Example 1 |
|---|---|---|---|
| (A-1) Silicone-modified epoxy resin | Example 3 | 50 | |
| (A-2) Epoxy resin | CEL2021P | 50 | 100 |
| (B) Curing agent | Synthesis Example 2 (B-1) | 89 | 105 |
| (C) Curing catalyst | PX-4MP | 0.5 | 0.6 |
| Antioxidant | ADEKA STAB A0-60 | 0.5 | 0.5 |
| Characteristics evaluation | | | |
| Viscosity (23° C.) | Pa · s | 4.8 | 2.5 |
| Tg | ° C. | 189 | 169 |
| CTE1 | ppm | 64 | 98 |
| CTE2 | ppm | 144 | 171 |
| Flexural strength | MPa | 88 | 125 |
| Flexural modulus | N/mm² | 2600 | 2500 |
| Water vapor permeability | g/m² · 24 h, 0.5 mm thick | 3.5 | 6.8 |
| Hardness (Shore D) | — | 77 | 82 |

As is obvious from the results of Table 1, the composition of Example 3 is excellent in low gas permeability and strength. On the other hand, the composition of Comparative Example 1 has excellent strength, but is poor in low gas permeability.

What is claimed is:

1. A silicone-modified epoxy resin having a branched structure represented by the following Formula (1):

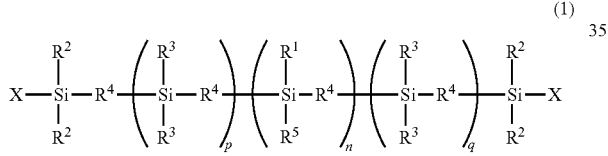

(1)

wherein $R^1$ independently represents a monovalent aromatic hydrocarbon group having 6 to 12 carbon atoms;

$R^2$ independently represents a monovalent aliphatic hydrocarbon group having 1 to 12 carbon atoms;

$R^3$ independently represents a monovalent aliphatic hydrocarbon group having 1 to 12 carbon atoms or a monovalent aromatic hydrocarbon group having 6 to 12 carbon atoms;

$R^4$ represents an oxygen atom or a divalent hydrocarbon group represented by the formula:

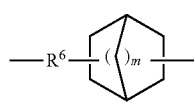

(2)

provided that at least one $R^4$ represents the divalent hydrocarbon group represented by the formula (2);

wherein $R^6$ represents a single bond or an alkylene group having 1 to 6 carbon atoms; and m represents an integer from 0 to 2;

$R^5$ represents a group represented by the following Formula (3):

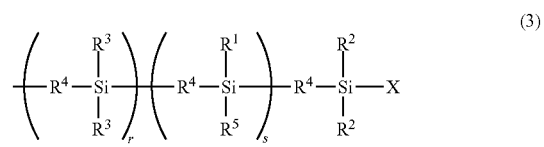

(3)

wherein $R^1$, $R^2$, $R^3$, and $R^4$ respectively have the same meanings as described above; r and s each represent an integer from 0 to 10; X represents a structure represented by the following Formula (5); and the repeating units represented by r and s in the formula respectively include a block unit structure and/or a random unit structure; or $R^5$ represents a group represented by the following Formula (4):

(4)

wherein $R^2$, $R^4$, and X respectively have the same meanings as described above;

X represents a group represented by the following Formula (5):

(5)

wherein $R^7$ represents a single bond or an alkylene group having 1 to 6 carbon atoms and optionally containing an ester bond or an ether bond; and m represents an integer from 0 to 2; and n represents an integer from 1 to 10; and p and q each represent an integer from 0 to 10, provided that the repeating units represented by p, n, and q in the formula respectively include a block unit structure and/or a random unit structure.

2. The silicone-modified epoxy resin having a branched structure according to claim 1, wherein in Formula (1), $R^1$ represents a group selected from a phenyl group, a benzyl group, a 2-phenylethyl group, and a 2-phenylpropyl group.

3. The silicone-modified epoxy resin having a branched structure according to claim 1, wherein in Formula (1), n represents 1 or 2.

4. The silicone-modified epoxy resin according to claim 1, wherein the silicone-modified epoxy resin is an addition reaction product between a compound represented by the following Formula (6):

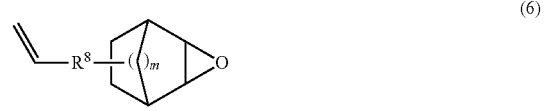

(6)

wherein m has the same meaning as described above; and $R^8$ represents a single bond or an alkylene group having 1 to 4 carbon atoms and optionally containing an ester bond or an ether bond, and a compound represented by the following Formula (7):

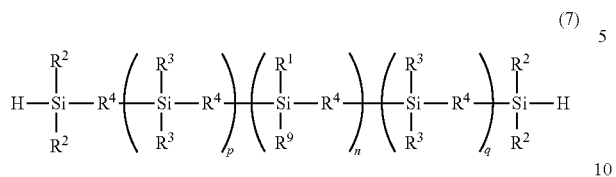

wherein $R^1$ to $R^4$, n, p, and q respectively have the same meanings as described above; and $R^9$ represents a group represented by the following Formula (8):

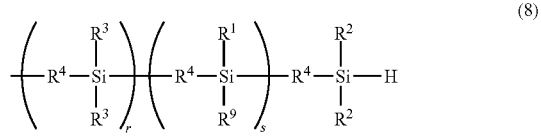

wherein $R^1$ to $R^4$, $R^9$, r, and s respectively have the same meanings as described above, or $R^9$ represents a group represented by the following Formula (9):

wherein $R^2$ and $R^4$ respectively have the same meanings as described above.

5. The silicone-modified epoxy resin according to claim 1, wherein the silicone-modified epoxy resin is obtained by oxidizing a polyvalent olefin-based compound represented by the following Formula (10):

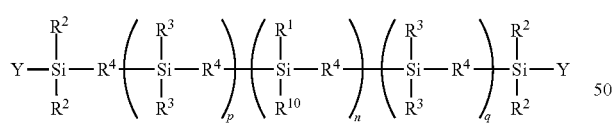

wherein $R^1$ to $R^4$, n, p, and q respectively have the same meanings as described above; and $R^{10}$ represents a group represented by the following Formula (11):

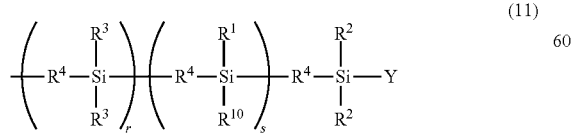

wherein $R^1$ to $R^4$, $R^{10}$, r, and s respectively have the same meanings as described above, or the following Formula (12):

and Y represents a group represented by the following Formula (13):

wherein $R^7$ and m respectively have the same meanings as described above.

6. An epoxy resin composition comprising (A) a silicone-modified epoxy resin according to claim 1; and (B) an epoxy resin curing agent.

7. An epoxy resin composition comprising (A) a silicone-modified epoxy resin according claim 1; and (C) an epoxy resin curing accelerator.

8. The epoxy resin composition according to claim 6, wherein the epoxy resin curing agent is at least any one selected from an amine-based curing agent, a phenolic curing agent, an acid anhydride curing agent, and a polyvalent carboxylic acid resin.

9. A cured product formed by curing the epoxy resin composition according to claim 6.

10. A polyvalent olefin-based compound represented by the following formula (10):

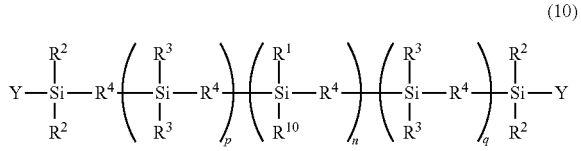

wherein $R^1$ independently represents a monovalent aromatic hydrocarbon group having 6 to 12 carbon atoms;
$R^2$ independently represents a monovalent aliphatic hydrocarbon group having 1 to 12 carbon atoms;
$R^3$ independently represents a monovalent aliphatic hydrocarbon group having 1 to 12 carbon atoms or a monovalent aromatic hydrocarbon group having 6 to 12 carbon atoms;
$R^4$ represents an oxygen atom or a divalent hydrocarbon group represented by the formula:

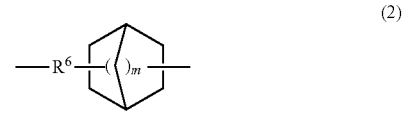

provided that at least one $R^4$ represents the divalent hydrocarbon group represented by the formula (2);
$R^6$ represents a single bond or an alkylene group having 1 to 6 carbon atoms; and m represents an integer from 0 to 2;
n represents an integer from 1 to 10;

p and q each represent an integer from 0 to 10, provided that the repeating units represented by p, n, and q in the formula respectively include a block unit structure and/or a random unit structure;

and $R^{10}$ represents a group represented by the following Formula (11):

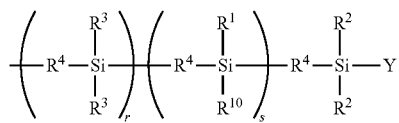

(11)

wherein $R^1$ to $R^4$, and $R^{10}$, respectively have the same meanings as described above;

wherein r and s each represent an integer from 0 to 10; and the repeating units represented by r and s in the formula respectively include a block unit structure and/or a random unit structure;

or the following Formula (12):

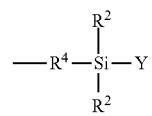

(12)

and Y represents a group represented by the following Formula (13):

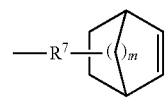

(13)

wherein $R^7$ represents a single bond or an alkylene group having 1 to 6 carbon atoms and optionally containing an ester bond or an ether bond; and m represents an integer from 0 to 2.

* * * * *